US012181219B2

(12) United States Patent
Ortiz et al.

(10) Patent No.: US 12,181,219 B2
(45) **Date of Patent: *Dec. 31, 2024**

(54) LOW PROFILE DESIGN AIR TUNNEL SYSTEM AND METHOD FOR PROVIDING UNIFORM AIR FLOW IN A REFRACTANCE WINDOW DRYER

(71) Applicant: E. & J. Gallo Winery, Modesto, CA (US)

(72) Inventors: Jorge Ortiz, Fresno, CA (US); Ernesto Rios Delao, Madera, CA (US); Dan Burgess, Clovis, CA (US)

(73) Assignee: E. &J. Gallo Winery, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,038

(22) Filed: Jul. 12, 2023

(65) Prior Publication Data

US 2023/0349634 A1 Nov. 2, 2023

Related U.S. Application Data

(63) Continuation of application No. 17/542,197, filed on Dec. 3, 2021, now Pat. No. 11,740,016, which is a (Continued)

(51) Int. Cl.

*F26B 3/04* (2006.01)
*F26B 15/18* (2006.01)

(Continued)

(52) U.S. Cl.

CPC ................ *F26B 3/04* (2013.01); *F26B 15/18* (2013.01); *F26B 21/004* (2013.01); *F26B 21/02* (2013.01);

(Continued)

(58) Field of Classification Search

CPC .......... F26B 3/04; F26B 15/18; F26B 21/004; F26B 21/02; F26B 21/08; F26B 21/10; F26B 23/10

(Continued)

(56) References Cited

U.S. PATENT DOCUMENTS

| | | | |
|---|---|---|---|
| 1,881,063 | A | 10/1932 | Randolph |
| 1,988,031 | A | 1/1935 | Barnett |

(Continued)

FOREIGN PATENT DOCUMENTS

| | | |
|---|---|---|
| CA | 2589260 A1 | 6/2006 |
| CA | 2906926 | 9/2014 |

(Continued)

OTHER PUBLICATIONS

SUNLITE Flat Multiwall Polycarbonate Sheet. Palram., {Mar. 4, 2013), URL: https://web.archive.org/Web/20130304050051/http://www.palram.com/SUNLITE, (Jul. 7, 2014), XP055281823.

(Continued)

*Primary Examiner* — Stephen M Gravini
(74) *Attorney, Agent, or Firm* — Dentons US LLP

(57) ABSTRACT

A low profile design air tunnel system and method for providing uniform air flow in a refractance window dryer are disclosed. According to one embodiment, a system comprises a conditioned air supply manifold that provides air into a drying chamber. The system has a drying belt directed through the drying chamber. A feed application tray at a first end of the drying belt applies a liquid to the drying belt. The system has an exhaust manifold located at the first end of the drying belt.

20 Claims, 6 Drawing Sheets

Related U.S. Application Data continuation of application No. 16/661,830, filed on Oct. 23, 2019, now Pat. No. 11,221,179.

(60) Provisional application No. 62/751,273, filed on Oct. 26, 2018.

(51) Int. Cl.
*F26B 21/00* (2006.01)
*F26B 21/02* (2006.01)
*F26B 21/08* (2006.01)
*F26B 21/10* (2006.01)
*F26B 23/10* (2006.01)

(52) U.S. Cl.
CPC .............. *F26B 21/08* (2013.01); *F26B 21/10* (2013.01); *F26B 23/10* (2013.01)

(58) Field of Classification Search
USPC ............................................ 34/428, 611–665
See application file for complete search history.

(56) References Cited

U.S. PATENT DOCUMENTS 2,134,906 A 11/1938 Byron
2,235,559 A 3/1941 Mayer
2,911,732 A 11/1959 Webb
3,108,402 A 10/1963 Henry
3,150,005 A 9/1964 Oleson
3,151,950 A 10/1964 Newman
3,206,866 A 9/1965 McCabe
3,217,421 A 11/1965 Lowe
3,228,113 A 1/1966 Fannon, Jr.
3,250,315 A 5/1966 Osborne et al.
3,258,467 A 6/1966 Anderson et al.
3,266,559 A 8/1966 Osborne
3,307,270 A 3/1967 Kruger
3,436,791 A 4/1969 Chambon
3,570,576 A 3/1971 Griffon
3,641,681 A 2/1972 Brock
3,805,316 A 4/1974 Sheppard
3,915,691 A 10/1975 Sakagami et al.
4,127,947 A 12/1978 Webb et al.
4,152,842 A 5/1979 Laughlin
4,259,063 A 3/1981 Spirin et al.
4,306,358 A 12/1981 King, Jr.
4,452,822 A 6/1984 Shrikhande
4,631,837 A 12/1986 Magoon
4,664,061 A 5/1987 Morioka et al.
4,763,572 A 8/1988 Kuehl
5,052,313 A 10/1991 Walker
5,098,790 A 3/1992 Diemunsch et al.
5,238,503 A 8/1993 Phenix et al.
5,557,858 A * 9/1996 Macaluso ............ F26B 17/045 34/208
5,617,647 A 4/1997 Okane et al.
5,632,097 A 5/1997 Snitchler et al.
5,743,022 A 4/1998 Hall Taylor
5,884,769 A 3/1999 Anderson
6,047,484 A 4/2000 Bolland et al.
RE36,796 E * 8/2000 Sato ........................ F26B 5/048 34/92
6,105,273 A * 8/2000 Johanson ................... B01J 8/10 34/267
6,112,677 A 9/2000 Kuntschar et al.
6,195,913 B1 3/2001 Canet et al.
6,230,421 B1 5/2001 Reed, Sr. et al.
6,269,550 B1 8/2001 Martin
6,468,573 B1 10/2002 Herrick et al.
6,497,107 B2 12/2002 Maisotsenko et al.
6,539,645 B2 4/2003 Savarese
6,688,018 B2 2/2004 Soucy
6,742,277 B2 6/2004 Sakurazawa
6,990,748 B2 1/2006 Magoon et al.
6,990,751 B2 1/2006 Riley et al.
7,208,181 B1 4/2007 King et al.
7,211,413 B2 5/2007 Matsumoto et al.
7,325,331 B2 2/2008 Luukkanen
7,572,468 B1 8/2009 Ishida et al.
8,464,437 B1 6/2013 Weisselberg
8,567,099 B2 * 10/2013 Bai ......................... F26B 13/10 34/619
8,806,771 B2 * 8/2014 Holmes ................. B29B 13/065 34/59
8,826,558 B2 9/2014 Priebe et al.
8,889,054 B2 11/2014 Cakmak et al.
8,984,763 B2 3/2015 Savarese
9,068,777 B2 6/2015 Savarese
9,718,065 B1 8/2017 Cilia
9,829,249 B2 11/2017 Tice
9,863,704 B2 1/2018 Vild
10,335,720 B2 7/2019 Pomerleau
10,955,189 B2 * 3/2021 Saribal .................... F26B 21/10
11,143,454 B2 * 10/2021 Triglia, Jr. .............. F26B 3/347
11,221,179 B2 * 1/2022 Ortiz ....................... F26B 17/04
11,740,016 B2 * 8/2023 Ortiz ....................... F26B 21/10 34/428
11,740,017 B2 * 8/2023 Hoffman, Jr ............ F26B 15/18 34/633
2002/0055471 A1 5/2002 Bailey et al.
2002/0082459 A1 6/2002 Bailey et al.
2002/0095818 A1 7/2002 Jain et al.
2003/0041780 A1 3/2003 Isager et al.
2004/0191384 A1 9/2004 Naik et al.
2004/0194337 A1 10/2004 Gasparini et al.
2004/0231186 A1 11/2004 Kolb et al.
2005/0068774 A1 3/2005 Pippa et al.
2005/0115099 A1 6/2005 Magoon et al.
2005/0175720 A1 8/2005 Mckenzie
2005/0181101 A1 8/2005 Harada et al.
2005/0249837 A1 11/2005 Massimino et al.
2006/0272174 A1 12/2006 Hartig
2007/0082399 A1 4/2007 Egorova-Zachernyuk
2007/0104842 A1 5/2007 Margolis et al.
2007/0110857 A1 5/2007 Hartal et al.
2007/0294911 A1 12/2007 Wilson
2008/0075824 A1 3/2008 Biehl
2008/0087168 A1 4/2008 Wright et al.
2008/0201978 A1 8/2008 Hammer
2008/0260915 A1 10/2008 Alkayali
2009/0226589 A1 9/2009 Ferreira
2009/0246315 A1 10/2009 Barnekow et al.
2010/0048957 A1 2/2010 Kim
2010/0145116 A1 6/2010 Van Keulen et al.
2012/0076904 A1 3/2012 Sinha et al.
2012/0151790 A1 6/2012 Savarese
2013/0122146 A1 5/2013 Ghaedian et al.
2014/0202028 A1 7/2014 De Santos Avila et al.
2014/0259725 A1 9/2014 Rossi et al.
2017/0079933 A1 3/2017 Whittle et al.
2017/0227288 A1 8/2017 Pardo
2018/0045462 A1 2/2018 Baeghbali et al.
2018/0156539 A1 6/2018 Baudouin et al.
2019/0336521 A1 11/2019 Kotra et al.
2020/0009109 A1 1/2020 Macaluso et al.
2020/0132370 A1 4/2020 Ortiz et al.
2022/0090857 A1 3/2022 Ortiz et al.
2022/0228805 A1 7/2022 Jolly

FOREIGN PATENT DOCUMENTS

CA 2987089 A1 12/2016
CA 3085863 A1 6/2018
CA 3115497 A1 * 4/2020 ............. F26B 15/18
CN 1323541 A 11/2001
CN 1986539 A 6/2007
CN 201184732 Y 1/2009
CN 105378412 A 3/2016
CN 107388803 A 11/2017
CN 109996551 A 7/2019
EP 0542669 A1 5/1993
EP 0695510 A1 2/1996

(56) References Cited

FOREIGN PATENT DOCUMENTS

| | | | | |
|---|---|---|---|---|
| EP | 2725925 | B1 | 5/2014 | |
| EP | 3009394 | A1 | 4/2016 | |
| EP | 3369783 | A1 | 9/2018 | |
| FR | 2399467 | A1 | 3/1979 | |
| FR | 3037640 | A1 | 12/2016 | |
| GB | 499539 | A | 1/1939 | |
| GB | 554930 | A | 7/1943 | |
| GB | 570827 | A | 7/1945 | |
| GB | 785584 | A | 10/1957 | |
| JP | S53125433 | A | 11/1978 | |
| JP | S57153702 | A | 9/1982 | |
| JP | S60248981 | A | 12/1985 | |
| JP | S61223481 | A | 10/1986 | |
| JP | H04209515 | A | 7/1992 | |
| JP | H7304976 | A | 11/1995 | |
| JP | H1015358 | A | 1/1998 | |
| JP | H1151562 | A | 2/1999 | |
| JP | 2004293942 | A | 10/2004 | |
| JP | 2005082588 | A | 3/2005 | |
| JP | 2006506448 | A | 2/2006 | |
| JP | 2006230272 | A | 9/2006 | |
| JP | 2008521403 | A | 6/2008 | |
| JP | 2009508877 | A | 3/2009 | |
| JP | 2009531316 | A | 9/2009 | |
| JP | 2009531330 | A | 9/2009 | |
| JP | 2012145281 | A | 8/2012 | |
| JP | 5185098 | B2 | 4/2013 | |
| JP | 2015-74489 | A | 4/2015 | |
| WO | WO-2002077105 | A1 | 10/2002 | |
| WO | WO-03079816 | A1 | 10/2003 | |
| WO | WO-2006058222 | A2 | 6/2006 | |
| WO | WO-2008004206 | A2 | 1/2008 | |
| WO | WO-2010139746 | A2 | 12/2010 | |
| WO | WO-2012/009469 | A2 | 1/2012 | |
| WO | WO-2012/079094 | A1 | 6/2012 | |
| WO | WO-2013/003616 | A1 | 1/2013 | |
| WO | WO-2014145952 | A1 | 9/2014 | |
| WO | WO-2015/052872 | A1 | 4/2015 | |
| WO | WO-2016203170 | A1 | 12/2016 | |
| WO | WO-2018061009 | A1 | 4/2018 | |
| WO | WO-2019119153 | A1 | 6/2019 | |
| WO | WO-2019211797 | A1 | 11/2019 | |
| WO | WO-2020086957 | A1 * | 4/2020 | .............. F26B 15/18 |
| WO | WO-2021022298 | A2 | 2/2021 | |

OTHER PUBLICATIONS

Ayhan, Topuz et al; Influence of different drying methods of carotenoids and capsaicinoids of paprika (CV jalapeno) Food Chemistry, Elsevier LtD, NL, vol. 129, No. 3; Nat 5, (2011) pp. 860-865.
Bolland: Refractance Window Food Drying System Delivers Quality Product Efficiently, Jul. 21, 2000; Retrieved from the Internet: URL:https://www.foodonline.com/doc/refractance- window-food-drying-system-deliver-0001, retrieved on Jun. 29, 2018.
Buskov et al, Separation of chlorophylls and their degradation products using packed col. supercritical fluid chromatography (SFC) HRC, Journal of High Resolution Chromatography (1999), vol. 22, No. 6, pp. 339-342.
Caparino et al., "Effect of drying methods on the physical properties and microstructures of mango (Philippine 'Carabao' var.) powder", Journal of Food Engineering 111 (2012).
Careri, Supercritical fluid extraction for liquid chromatographic determination of carotenoids in Spirulina Pacifica algae: a chemometric approach. Journal of chromatography. A, (Mar. 3, 20010) vol. 912, No. 1, pp. 61-71.
Clarke, Phillip, Refractance Window TM Down Under, Jan. 1, 2004, pp. 813-820, XPO55489211, Retrieved from the internet: URL: http://files.gwdryer.com/dryer-technology-comparison.pdf—Retrieved on Jun. 29, 2018, Chapter: "The Refractance Windows Process"; p. 814.
Hossain, Concentration of anthocyanin pigments in blackcurrant pomace by ultrafiltration. Food Australia (2003), vol. 55, No. 6, pp. 263-266.
Ide et al, Ultrafiltration with spiral wound membrane technology. Official Proceedings—International Water Conference (1990), 51st, 362-73.
Lionetto, Effect of the daily ingestion of a purified anthocyanin extract from grape skin on rat serum antioxidant capacity. Physiological research/ Academia Scientiarum Bohemoslovaca, (2011) vol. 60, No. 4, pp. 637-645. Electronic Publication Date: May 16, 2011.
Nindo et al, Refractance window dehydration technology: a novel contact drying method. Drying Technology (2007), 25(1-3), 37-48.
Pavan, "Effects of freeze drying, refractive window drying and hot-air drying on the quality parameter of Acai", Thesis, University of Illinois (2010).
Ravindra, Antioxidant activity of the anthocyanin from carrot (*Daucus carota*) callus culture. International journal of food sciences and nutrition, (Sep. 2003) vol. 54, No. 5, pp. 349-355.
Shao, J; Zydney, A, "Optimization of Ultrafiltration/Diafiltration Processes for Partially Bound Impurities", *Biotechnology and Bioengineering*, 87/3, pp. 286-292, Jul. 7, 2004.
Skerget et al, Separation of paprika components using dense CO2. Acta Alimentaria (Budapest) (1998), vol. 27, No. 2, pp. 149-160.
Thao et al,"Methods to characterize the structure of food powders", Bioscience, Biotechnology, and Biochemistry, vol. 81, Issue 4,Apr. 3, 2017.
Zhao, Yun-xia et al., Research on the purification and antioxidant activity of mulberry red pigment, Science and Technology of Food Industry, vol. 29, pp. 250-253 2008.
Zimmer, Membrane filtration: practical experience with juice pretreatment and filtration of coloured juices. Fruit Processing (2007), 17(3), 153-158.
Abonyi, B. I. et al., "Quality retention in strawberry and carrot purees dried with refractance window system," JFS: Food Engineering and Physical Properties, 2001, 67(2):1051-1056.
Abul-Fadl, M.M. and Ghanem, T.H., "Effect of Refractance-Window (RW) Drying Method on Quality Criteria of Produced Tomato Powder as Compared to the Convection Drying Method," World Applied Sciences Journal, 2011, 15(7):953-965.
Buckton G, Darcy P. Assessment of disorder in crystalline powders—a review of analytical techniques and their application. Int J Pharm. Mar. 15, 1999;179(2):141-58.
Hartel, Richard, "Crystallization in Foods," Aspen Publication, 2001, 32 pages.
Nindo, C., "Novel drying method for Vegetables, Fruits, Herbs, and Aquatic Resources," The Canadian Society for Bioengineering, 2008, 9 pages.
Wikipedia—Carminic acid, 2023, 5 pages.
Commission Regulation (EU) No. 231/2012 of Mar. 9, 2012 laying down specifications for food additives listed in Annexes II and III to Regulation (EC) No. 1333/2008 of the European Parliament and of the Council Text with EEA relevance.
International Search Report and Written Opinion for PCT/US2021/014461 dated May 13, 2021 (21 pages).
U.S. Appl. No. 18/364,762, filed Aug. 3, 2023, Natural Crystalline Colorant and Process for Production, Rossi.
U.S. Appl. No. 17/558,221, filed Dec. 21, 2021, Multi-Chamber Dryer Using Adjustable Conditioned Air Flow, Rossi.
U.S. Appl. No. 18/473,522, filed Sep. 25, 2023, Mobile Refractance Window Dryer, Ortiz.
U.S. Appl. No. 17/154,953, filed Jan. 21, 2021, Methods for Processing Plant Materials and Producing Dried Products, Ortiz.
U.S. Appl. No. 18/451,402, filed Aug. 17, 2023, Cannabinoid Emulsions and Complexes and Related Methods of Manufacture, Kelm.

* cited by examiner

LOW PROFILE DESIGN AIR TUNNEL SYSTEM AND METHOD FOR PROVIDING UNIFORM AIR FLOW IN A REFRACTANCE WINDOW DRYER

CROSS-REFERENCE TO RELATED APPLICATIONS

The present application is a continuation of U.S. Non-Provisional application Ser. No. 17/542,197, filed on Dec. 3, 2021 and titled "Low Profile Design Air Tunnel System and Method for Providing Uniform Air Flow in a Refractance Window Dryer," which is a continuation of U.S. Non-Provisional application Ser. No. 16/661,830, filed on Oct. 23, 2019 and titled "Low Profile Design Air Tunnel System and Method for Providing Uniform Air Flow in a Refractance Window Dryer," which claims the benefit of and priority to U.S. Provisional Application Ser. No. 62/751,273, filed on Oct. 26, 2018 and titled "Low Profile Design Air Tunnel System and Method for Providing Uniform Air Flow in a Refractance Window Dryer," the entire contents of each of which are incorporated by reference.

FIELD

The present application relates in general to the drying of a product. In particular, the present disclosure is directed to a low profile design air tunnel system and method for providing uniform air flow in a refractance window dryer.

BACKGROUND

In a traditional drying system, the product to be dried is placed on a continuous belt that floats on the surface of a body of heated water. Heat is transferred by conduction from the circulated heated water directly to the product through a belt of a polymer membrane. The heated water is maintained at a pre-determined temperature to allow optimum drying of the product.

However, the traditional drying system utilizes a large volume of ambient air to remove water vapor released during the product drying process. The uncontrolled humidity and the temperature of ambient air within the dryer leads to a wide variation in dryer performance and product quality. For example, a dryer operating in a dry climate performs differently in a humid climate. Similarly, dryer performance varies in cold and hot climates, and from season-to-season or day to night at the same location.

Furthermore, the traditional drying system increases water vapor pressure in the product by increasing the product temperature due to thermal energy conducted from the body of heated water through the drying belt. However, the traditional drying system does not reduce water vapor pressure, increase the temperature of air within the dryer, or reduce the humidity of air within the dryer, all of which can improve dryer performance.

In a traditional multi-chamber drying system, the product is dried on a continuous belt using a lateral airflow method with and without conditioned air being introduced along one side of the belt in regular intervals, having exhaust mechanisms on the opposite side, in a high and low profile design. Such a design promotes the short circuiting of air, making for inefficient use of the full moisture carrying capacity of the air that was short circuiting. Thus, the design failed to effectively distribute the air across the entire width of the belt.

Another issue with the traditional design was that the perpendicular flow across the belt did not take full advantage of the heat gained from the evaporation of the water from product on belt, consequently requiring significantly more air. The original elevated hood design of the system also resulted in air free flowing high above the belt surface, so any temperature gain was not fully utilized especially given the high CFM flowrate.

SUMMARY

A low profile design air tunnel system and method for providing uniform air flow in a refractance window dryer are disclosed. According to one embodiment, a system comprises a conditioned air supply manifold that provides air into a drying chamber. The system has a drying belt directed through the drying chamber. A feed application tray at a first end of the drying belt applies a liquid to the drying belt. The system has an exhaust manifold located at the first end of the drying belt.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

Figure 1:
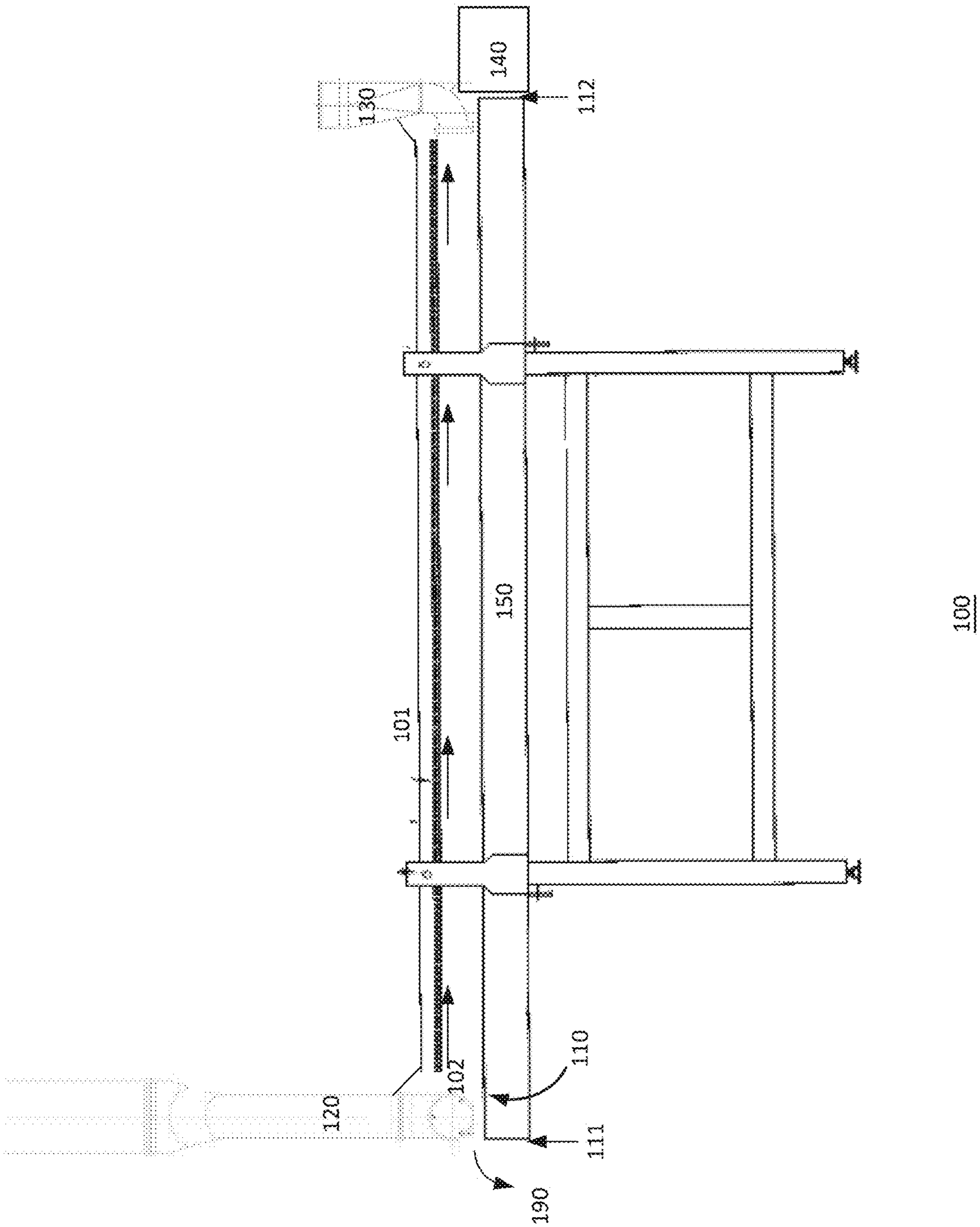
FIG. 1 illustrates a cross-sectional view of an exemplary dryer using an air supply manifold that extends across the width of the drying belt, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A low profile design air tunnel system and method for providing uniform air flow in a refractance window dryer are disclosed. According to one embodiment, a system comprises a conditioned air supply manifold that provides air into a drying chamber. The system has a drying belt directed through the drying chamber. A feed application tray at a first end of the drying belt applies a liquid to the drying belt. The system has an exhaust manifold located at the first end of the drying belt.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Each of the features and teachings disclosed herein can be utilized separately or in conjunction with other features and teachings to provide a multi-chamber dryer using adjustable conditioned air flow with a low profile air tunnel system. Representative examples utilizing many of these additional features and teaching, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Other features and advantages will become apparent from the following detailed description, taken in conjunction with the accompanying drawings, which illustrate by way of example, the features of the various embodiments.

A multi-chamber dryer using adjustable conditioned counter current air flow with a low profile air tunnel system is disclosed. The present drying system enables the delivery of airflow to remain near the belt/product surface taking full advantage of the heat gain and the increased moisture capacity of the air flowing counter current respective to the belt/product flow. The present drying system increases and improves a dryer throughput at steady state operation. The present drying system improves heat transfer by providing faster water removal from a product surface on a drying belt, uses a simplified and less expensive air handling system, and improves the quality of the dried product with more consistent drying characteristics. The components of the drying system described herein allow for the uniform supply of conditioned air across the width of the drying belt, and a low profile tunnel near the product surface evaporation area with constant air flow that creates a slight negative pressure environment with an exhaust fan, thus the components together enable a more efficient and better performing drying system.

According to one embodiment, an apparatus includes a drying belt configured to receive a product to be dried on a first surface of the drying belt, and a heat medium in contact with a second surface of the drying belt. The heat medium is configured to heat the product and is maintained at a pre-determined temperature. The apparatus further includes a manifold that is positioned above the drying belt, where the manifold includes one or more slits that inject conditioned air across the entire width of the drying belt, directed through the drying chamber towards the exhaust manifold where the product is applied to the belt. Through this process, evaporated water from the product is removed resulting in the formation of dried crystals. According to one embodiment, conditioned air is air that has a predetermined humidity and temperature. The humidity and temperature of the conditioned air may be specific to the types of products being dried. According to another embodiment, the air injected into the dryer is ambient air taken from outside the room or outside the building in which the dryer is installed.

In the description below, for purposes of explanation only, specific nomenclature is set forth to provide a thorough understanding of the present disclosure. However, it will be apparent to one skilled in the art that these specific details are not required to practice the teachings of the present disclosure.

The present drying system dries a liquid or slurry product placed on a continuous drying belt by properly directing conditioned air across the surface of the product, according to one embodiment. The liquid or slurry may be from a plant (e.g., strawberry puree, carrot puree, etc.). The present drying system includes a series of air distribution manifolds to direct conditioned air and an apparatus to improve product feed and removal. In one embodiment, low pressure air is distributed through adjustable slots, or air knives, to effectively distribute the air across the entire width of the drying belt. In another embodiment, the present drying system has low profile side panels, enabling the delivery of airflow to remain near the drying belt, requiring less air than previous designs by taking full advantage of the heat gained from the evaporation of water from product on the drying belt.

FIG. 1 illustrates a cross-sectional view of an exemplary dryer 100 using an air supply manifold 120 that extends across the width of the drying belt 110, according to one embodiment. The dryer 100 includes a cover 101 that provides a cover and headspace above a drying belt 110 for the dryer 100, an air supply manifold 120 that introduces conditioned air 102 into the dryer 100 and an air outlet exhaust manifold 130. The drying belt 110 floats above a heated medium flowing in a trough 150. Trough 150 may include a pump to recirculate the heated medium between a heating tank and the trough 150. The heated medium may include heated water or other forms of heat transfer fluid known in the art. The temperature of the heated water or other heat transfer fluids within the heated medium is maintained at a pre-determined temperature. Dryer 100 includes a single trough 150, however multiple troughs may be used, with each trough having its own air supply manifold 120 and exhaust manifold 130. In alternate embodiments, multiple troughs share a single air supply manifold 120 and exhaust manifold 130. According to one embodiment, dryer 100 may be one chamber in a multi-chamber dryer. In a multi-chamber dryer system, a single drying belt 110 spans across all of the drying chambers effectively doubling, tripling, etc. the length of the drying belt 110. The drying belt 110 is guided by rollers (not shown) that move the drying belt 110 in a continuous loop from one end of the dryer 100 to the other.

According to one embodiment, a liquid or slurry product is applied to the drying belt 110. The conditioned air supply manifold 120, which extends across the width of the drying belt 110, introduces conditioned air 102 at the discharge end of the belt 111, where the dried product is removed from the dryer 100. The exhaust manifold 130 is located at the opposite end 112 of the drying belt 110, near the feed liquid application tray 140, and moist air is removed via dryer exhaust manifold 130 that extends across the width of the drying belt 110. In one embodiment, the liquid or slurry product is dried when moist air is removed by dryer exhaust manifold 130, at the beginning end 112 of the belt 111. Conditioned air supply manifold 120 at the discharge end 111 of the belt 110 provides conditioned air 102. According to one embodiment, the conditioned air 102 temperature increases approximately 15 degrees due to the heat given off by the evaporation of the heated liquid, by the time it reaches the discharge end 111 of the belt 110, which increases the capacity of moisture that the air can absorb. This can reduce the airflow requirement by as much as 10 times to approximately 200-500 CFM. Dried material 190 is removed at the discharge end 111 of the belt 110.

Figure 2:
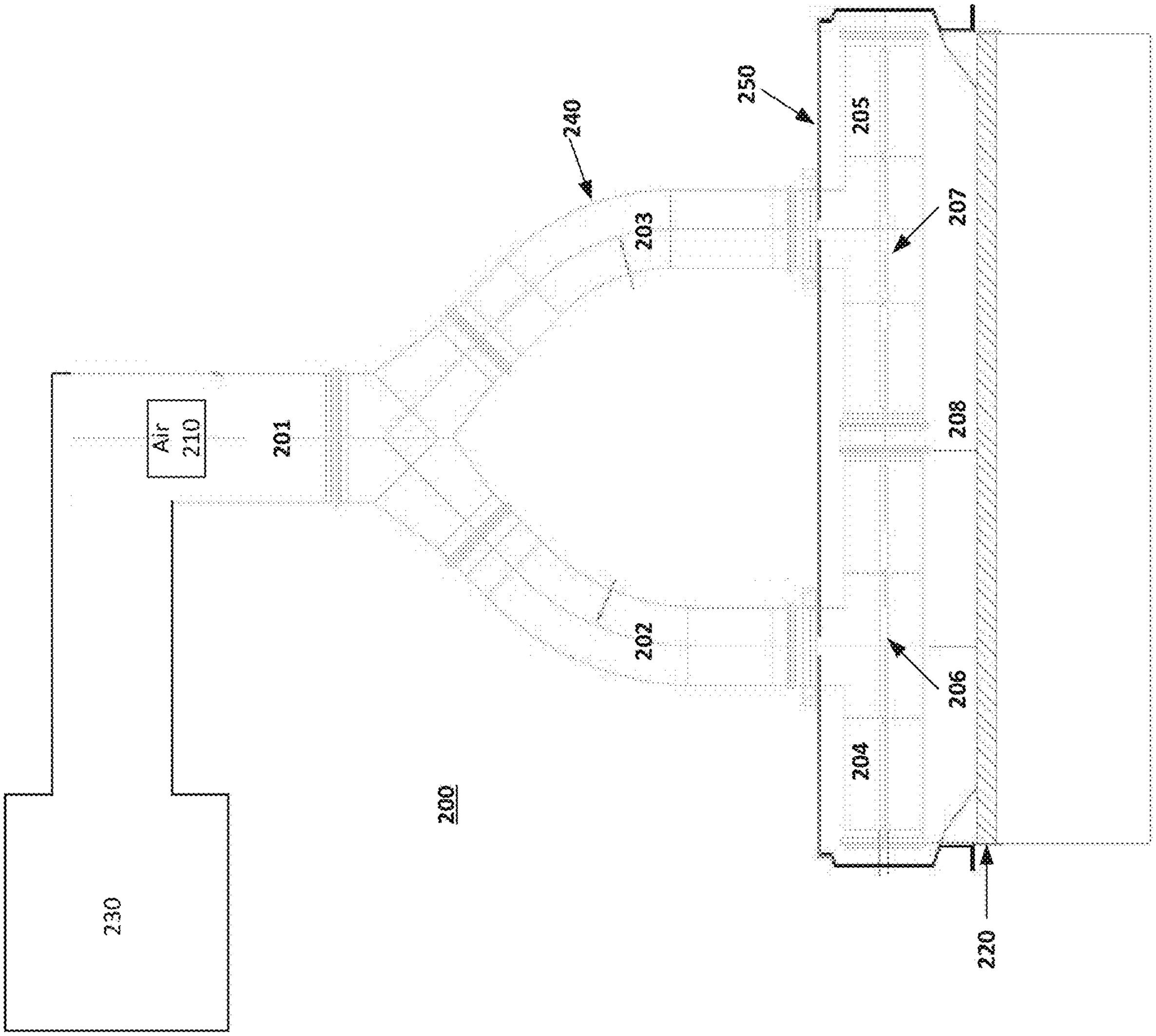
FIG. 2 illustrates an exemplary dryer air supply manifold that distributes conditioned air, according to one embodiment.

FIG. 2 illustrates an exemplary dryer air supply manifold 240 that distributes conditioned air, according to one embodiment. Dryer air supply manifold 240 distributes conditioned air 210 across the entire width of the drying belt 220 at the discharge end of the dryer, according to one embodiment. Conditioned air supply manifold has a Y-shaped design, where the top tube 201 brings in conditioned air 210 from a filtered air system 230, such as a HEPA system. The conditioned air 210 travels through lower tubes 202 and 203 and the air is distributed across the entire width of drying belt 220. According to one embodiment, lower tubes 202 and 203 connect to horizontal manifolds 204 and 205 that have sanitary caps allowing for clean-in-place (CIP) cleaning and easy disassembly and reassembly. Horizontal manifolds 204 and 205 include slits 206 and 207 through which the air 210 is injected into the drying chamber 208. Horizontal manifolds 204 and 205 may each have three openings, each opening having a narrow oval shape, according to one embodiment. According to one embodiment, each opening of slit 206 and slit 207 is approximately one sixth the width of the dryer belt 320. In another embodiment, horizontal manifolds 204 and 205 each have a single opening, where each opening is approximately one half the width of the drying belt 220. According to one embodiment, horizontal manifold 204 has a length that is half the width of drying belt 220. Horizontal manifold 204 may have a diameter of approximately six inches. In alternate embodiments, horizontal manifolds 204 and 205 may each include a damper (not shown) to reduce the volume of conditioned air 210 released into chamber 208 through slits 206 and 207. The damper may also direct the flow of air down towards the drying belt 220 or towards the cover 250.

A filtered air system 230 provides conditioned air 210 to the conditioned air supply manifold 200. According to one embodiment, filtered air system 230 is an AAON unit, model number RN-025-3-0-EBDA, having a cooling capacity of 290 MBH, and a heating capacity of 328.1 MBH HVAC unit.

Figure 3:
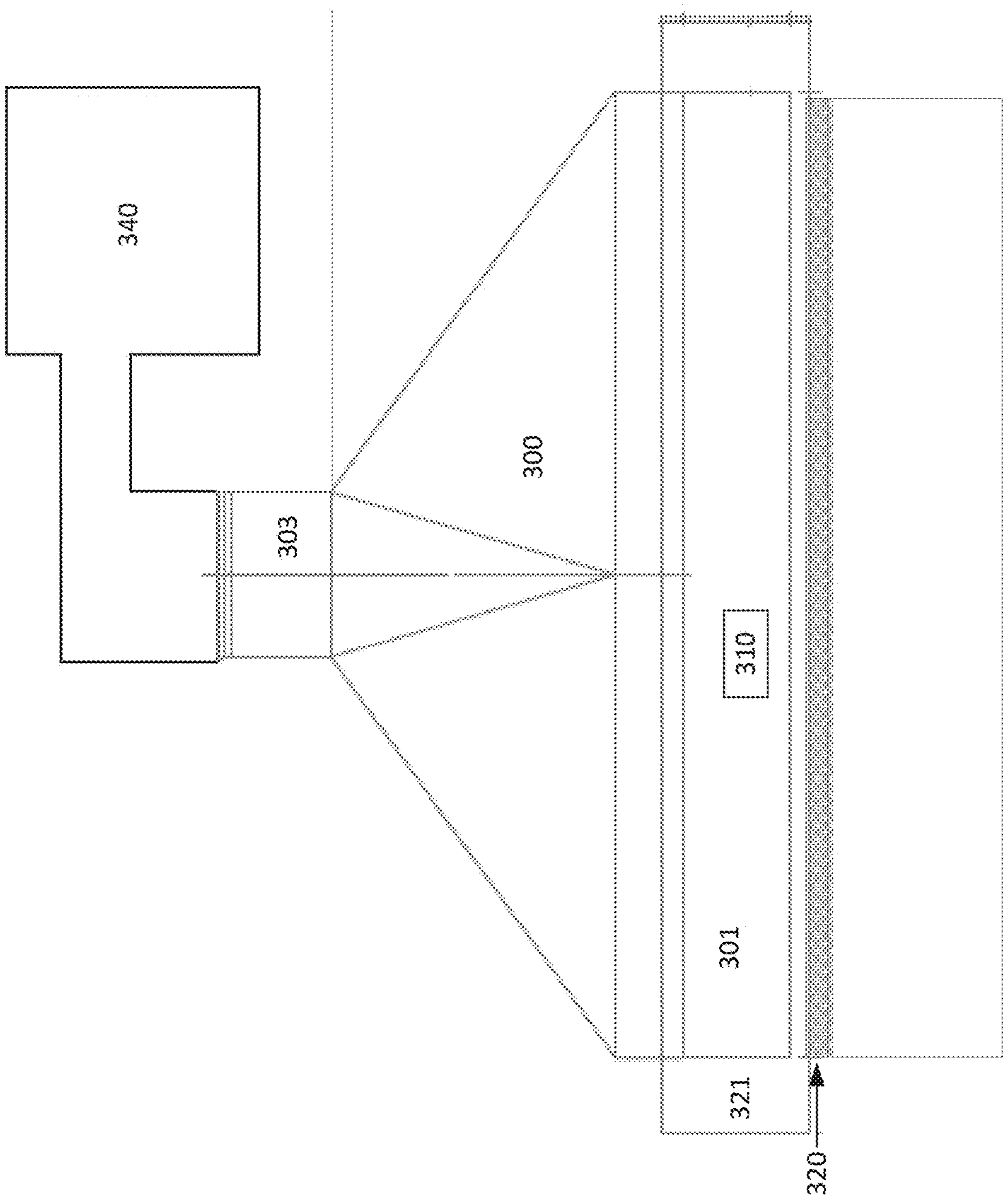
FIG. 3 illustrates a dryer exhaust manifold, according to one embodiment.

FIG. 3 illustrates a dryer exhaust manifold 300, according to one embodiment. Dryer exhaust manifold 300 is located at the beginning end of drying belt 320 near the feed liquid application tray, according to one embodiment. Dryer exhaust manifold 300 removes moist air 310 across the entire length and width of the drying tunnel 321. Dryer exhaust manifold 300 has a rectangular opening 301 that intakes moist air 310, and pulls up moist air 310 through tube 303 by using an exhaust blower 340. According to one embodiment, exhaust opening 301 has a width that is approximately the width of drying belt 320. According to another embodiment, exhaust manifold 300 may include a damper (not shown) to reduce the volume of moist air 310 removed from the drying chamber. An exhaust blower 340 discharges moist air 310 to the atmosphere outside the dryer room.

According to one embodiment, the exhaust blower 340 is a GREENHECK unit, model number CUBE-300XP-50, "Belt Drive Upblast Centrifugal Roof Exhaust Fan" rated for 3000 CFM at SP of 3.5 inches of water gauge driven by a 5 HP variable speed rated motor and variable frequency drive (VFD). In certain embodiments, the exhaust blower is oversized to create a negative pressure in drying tunnel, increasing the efficiency of evaporation, thus improving the moisture efficiency of moist air 310 removal.

Figure 4:
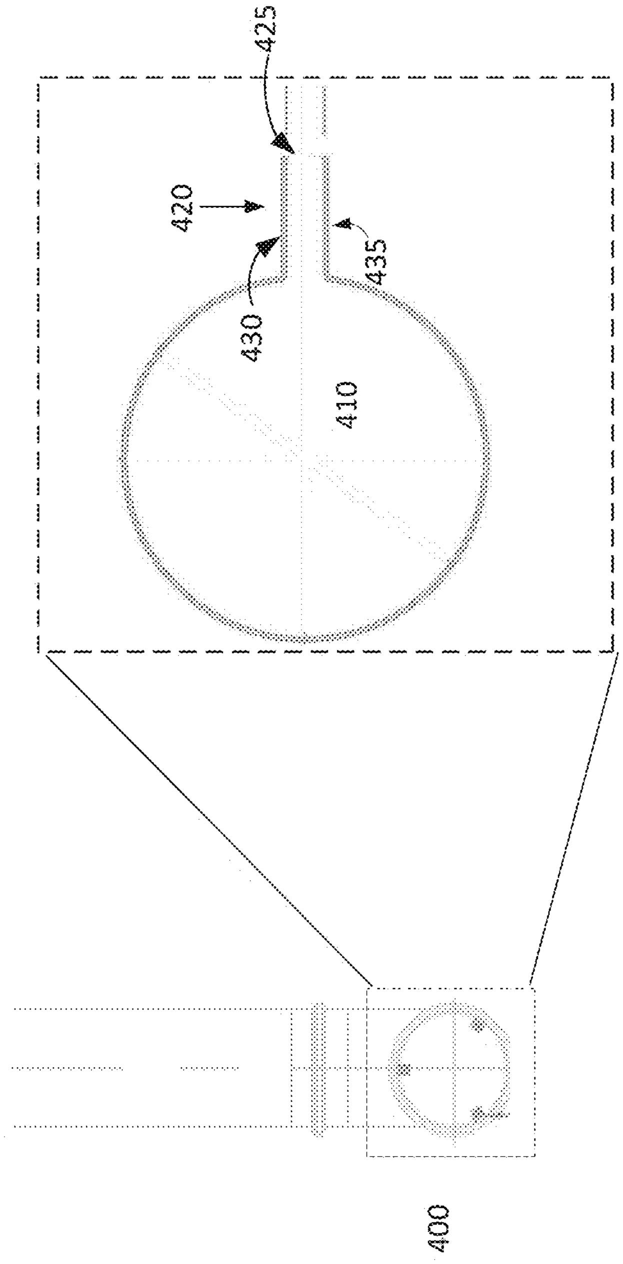
FIG. 4 illustrates an exemplary side view of a conditioned air supply manifold, according to one embodiment.

FIG. 4 illustrates an exemplary side view of the conditioned air supply manifold 400, according to one embodiment. Conditioned air supply manifold 400 has a circular body 410 that according to one embodiment has a six inch diameter. Conditioned air supply manifold 400 also includes a supply opening 420 that extends from the circular body 410. Supply opening 420 has a top portion 430 and a bottom portion 435 that are parallel to each other. According to one embodiment, top portion 430 and a bottom portion 435 are approximately 5⁄16 of an inch apart from the center of supply opening 420, creating a 5⁄8 inch opening 425. Top portion 430 and bottom portion 435 may extend approximately 2 inches from the circular body 410. The desired type of opening of dryer air knife 400 can vary by application, with circular opening 410 being more efficient for some applications and another type of opening, such as a hexagonal opening, for example, may be more efficient for other applications.

Figure 5:
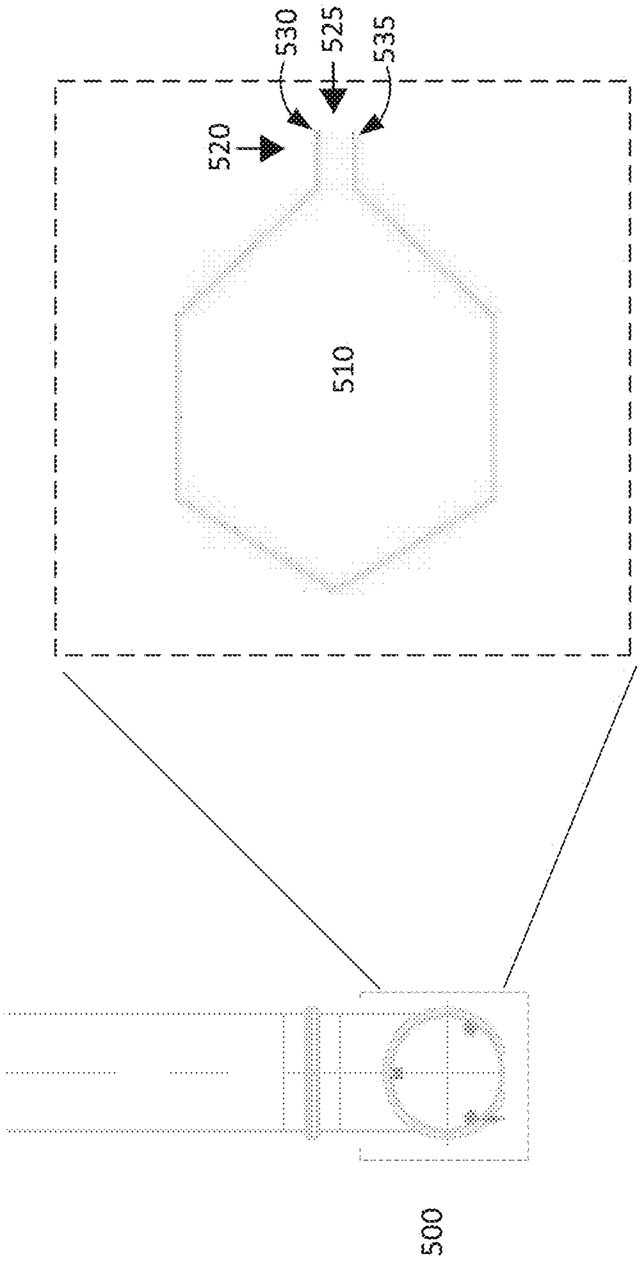
FIG. 5 illustrates an exemplary side view of a conditioned air supply manifold, according to another embodiment.

FIG. 5 illustrates an exemplary side view of a hexagonal conditioned air supply manifold 500, according to one embodiment. Conditioned air supply manifold 500 has a hexagonal body 510 that according to one embodiment has a six inch width. The hexagonal body 510 has six sides with adjacent side angles ranging from 120° to 132°, according to some embodiments. Conditioned air supply manifold 500 also includes a supply opening 520 that extends from the hexagonal body 510 where two sides approach each other. Supply opening 520 has a top portion 530 and a bottom portion 535 that are parallel to each other. According to one embodiment, top portion 530 and a bottom portion 535 are approximately 5⁄16 of an inch from the center of supply opening 520, creating a 5⁄8 inch opening 525. Top portion 530 and bottom portion 535 may extend approximately 2 inches from the hexagonal body 510.

The manifolds described above may be made of food grade aluminum or stainless steel, according to one embodiment. In alternate embodiments, the manifolds are made of high temperature plastic such as PVC, or a combination of PVC and metal.

Figure 6:
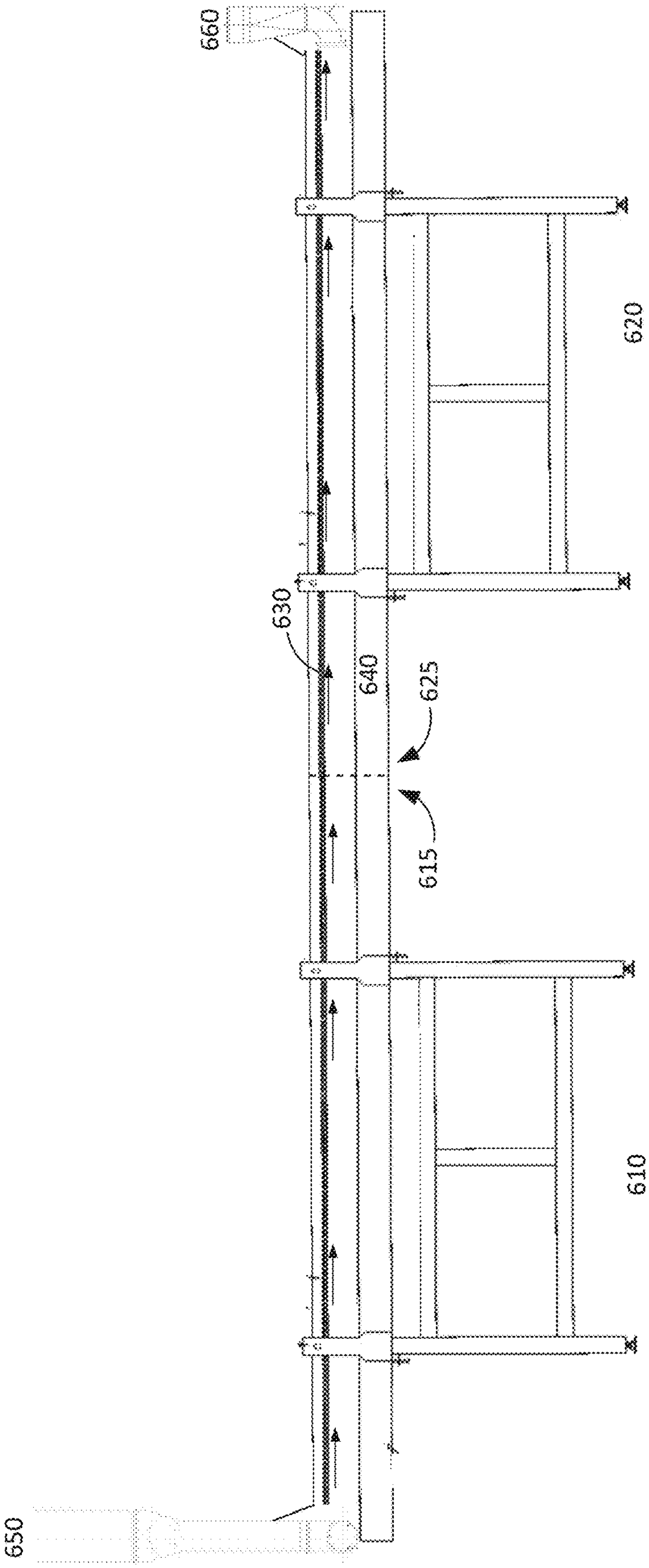
FIG. 6 illustrates a cross-sectional view of two drying chambers assembled to form a multi-chamber dryer assembly, according to one embodiment.

FIG. 6 illustrates a cross-sectional view of two exemplary drying chambers 610 and 620 connectable by way of the discharge end 625 of one chamber and the opposite end 615 of the other chamber, according to one embodiment. The connection between drying chambers 610 and 620 may be provided by adhesive, locks, sealants, covers, or other attachment mechanisms, according to some embodiments. A continuous belt 630 may be directed through all of the drying chambers guided by rollers (not shown). These rollers move drying belt 630 in a continuous loop from one end of drying chamber 610 to the opposite end of drying chamber 620 and back again. Drying belt 630 floats above a heated medium flowing in a trough 640, according to one embodiment. According to another embodiment, one trough per chamber is used where the temperature of the water in each trough is independently controlled.

Trough 640 may include a single pump or one pump per chamber, according to some embodiments. The pumps of trough 640 recirculate the heated medium between a heating tank and the trough 640. The heated medium may include heated water or other forms of heat transfer fluid known in the art. The temperature of the heated water or other heat transfer fluids within the heated medium is maintained at a pre-determined temperature. Each trough may have its own conditioned air supply manifold 650 and exhaust manifold 660. For example, multiple troughs share a single conditioned air supply manifold 650 and exhaust manifold 660 as shown in FIG. 6. Conditioned air supply manifold 650 and exhaust manifold 660 attach to the open ends of drying chambers 610 and 620. FIG. 6 shows conditioned air supply manifold 650 attaching to the unused side of drying chamber 610 and exhaust manifold 660 attaching to the unused side of dryer 620. These additional drying chambers may be added or removed in order to provide for an adjustable multi-chamber refractance window dryer, according to one embodiment.

The above example embodiments have been described herein above to illustrate various embodiments of implementing a multi-chamber dryer using adjustable conditioned air flow has been disclosed. Various modifications and departures from the disclosed example embodiments will occur to those having ordinary skill in the art. The subject matter that is intended to be within the scope of the present disclosure is set forth in the following claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that later filed claims and their equivalents define the scope of the invention.

What is claimed is:

1. A drying chamber, comprising:

a belt with an upper surface configured to transport a product along a length of the drying chamber;

a heated medium maintained at a pre-determined temperature below the belt and positioned so that the belt floats on the heated medium, wherein the heated medium comprises a heat transfer fluid;

an air supply manifold positioned over the belt and across a width of the belt; and an exhaust manifold positioned over the belt and across the width of the belt, wherein air exiting the air supply manifold is configured to flow from the air supply manifold to the exhaust manifold above the product.

2. The drying chamber of claim 1, wherein the width of the belt is perpendicular to the length of the drying chamber.

3. The drying chamber of claim 1, wherein the air entering the air supply manifold has a predetermined humidity and temperature.

4. The drying chamber of claim 3, further comprising a filtered air system coupled to the air supply manifold that feeds the air to the air supply manifold at the predetermined humidity and temperature.

5. The drying chamber of claim 4, wherein the filtered air system has a cooling and heating capacity.

6. The drying chamber of claim 4, wherein the heated medium increases the temperature of the air upon exiting the air supply manifold.

7. The drying chamber of claim 1, wherein the air supply manifold is configured to produce an air flow that is uniform across the width of the belt.

8. The drying chamber of claim 1, wherein the air exiting the air supply manifold is configured to flow counter-current to a direction of travel of the belt transporting the product.

9. The drying chamber of claim 1, wherein the air supply manifold is disposed at a product discharge end of the belt and the exhaust manifold is disposed at a product receiving end of the belt.

10. The drying chamber of claim 1, further comprising an exhaust fan configured to create a negative pressure environment within the drying chamber.

11. A drying method, comprising:

transporting a product on an upper surface of a conveyer belt along a length of a drying chamber, wherein the conveyer belt floats on a heated medium maintained at a predetermined temperature;

supplying air to the drying chamber via an air supply manifold positioned over the belt and across a width of the belt; and exhausting the air from the drying chamber via an exhaust manifold positioned over the belt and across the width of the belt so that the air flows above the product during drying.

12. The drying method of claim 11, wherein the width of the belt is perpendicular to the length of the drying chamber.

13. The drying method of claim 11, wherein supplying the air to the drying chamber via the air supply manifold comprises feeding the air to the air supply manifold at a predetermine temperature and humidity.

14. The drying method of claim 13, wherein the heated medium increases the temperature of the air upon exiting the air supply manifold.

15. The drying method of claim 11, wherein supplying the air to the drying chamber via the air supply manifold comprises feeding the air to the air supply manifold via a filtered air system.

16. The drying method of claim 15, wherein the filtered air system has a cooling and heating capacity.

17. The drying method of claim 11, wherein supplying the air to the drying chamber via the air supply manifold comprises producing an air flow that is uniform across the width of the belt.

18. The drying method of claim 11, wherein supplying the air to the drying chamber via the air supply manifold comprises directing the air to flow opposite to a direction of travel of the belt transporting the product.

19. The drying method of claim 11, wherein exhausting the air from the drying chamber via the exhaust manifold comprises creating a negative pressure environment within the drying chamber.

20. The drying method of claim 11, wherein supplying the air to the drying chamber via the air supply manifold occurs at a product discharge end of the belt and exhausting the air from the drying chamber via the exhaust manifold occurs at a product receiving end of the belt.

* * * * *